US012665199B2

(12) United States Patent
Lim et al.

(10) Patent No.: US 12,665,199 B2
(45) Date of Patent: Jun. 23, 2026

(54) IRREVERSIBLE ADDITIVE CONTAINED IN CATHODE MATERIAL FOR SECONDARY BATTERY, CATHODE MATERIAL INCLUDING THE SAME, AND SECONDARY BATTERY INCLUDING CATHODE MATERIAL

(71) Applicant: LG Energy Solution, Ltd., Seoul (KR)

(72) Inventors: Sung Chul Lim, Daejeon (KR);
Youngcheol Choi, Daejeon (KR);
Minchul Jang, Daejeon (KR); **Kyoung
Hoon Kim, Daejeon (KR); Yohan
Kwon, Daejeon (KR); Ilhong Kim**,
Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 721 days.

(21) Appl. No.: 17/785,285

(22) PCT Filed: Jul. 23, 2021

(86) PCT No.: PCT/KR2021/009531
§ 371 (c)(1),
(2) Date: Jun. 14, 2022

(87) PCT Pub. No.: WO2022/025531
PCT Pub. Date: Feb. 3, 2022

(65) Prior Publication Data
US 2023/0040242 A1      Feb. 9, 2023

(30) Foreign Application Priority Data
Jul. 28, 2020      (KR) ........................ 10-2020-0093872
Jul. 19, 2021      (KR) ........................ 10-2021-0094000

(51) Int. Cl.
*H01M 4/62*      (2006.01)
*H01M 4/02*      (2006.01)
(Continued)

(52) U.S. Cl.
CPC ......... *H01M 4/624* (2013.01); *H01M 4/0404*
(2013.01); *H01M 4/505* (2013.01);
(Continued)

(58) Field of Classification Search
CPC .... H01M 4/624; H01M 4/0404; H01M 4/505;
H01M 4/525; H01M 10/0525;
(Continued)

(56) References Cited

U.S. PATENT DOCUMENTS 6,660,432 B2      12/2003   Paulsen et al.
8,835,055 B2 *   9/2014    Chang .............. H01M 10/0525
                                                      429/231.1
(Continued)

FOREIGN PATENT DOCUMENTS

CN            1745490 A        3/2006
CN          110431109 A      11/2019
(Continued)

OTHER PUBLICATIONS

International Search Report for Application No. PCT/KR2021/009531 mailed Oct. 27, 2021, pp. 1-3.
(Continued)

*Primary Examiner* — Helen Oi K Conley
(74) *Attorney, Agent, or Firm* — Lerner David LLP

(57)                  ABSTRACT

An irreversible additive contained in a cathode material for a secondary battery according to one embodiment of the present disclosure, the irreversible additive being an oxide represented by the following chemical formula 1, wherein the oxide has a trigonal crystal structure, $$Li_{2+a}Ni_{1-b}Ti_bO_{2+c} \tag{1}$$

in the above formula, $-0.2 \leq a \leq 0.2$, $0 < b \leq 0.2$, and $0 \leq c \leq 0.2$.

10 Claims, 3 Drawing Sheets

(51) Int. Cl.

| | |
|---|---|
| *H01M 4/04* | (2006.01) |
| *H01M 4/505* | (2010.01) |
| *H01M 4/525* | (2010.01) |
| *H01M 10/0525* | (2010.01) |
| *H01M 50/46* | (2021.01) |

(52) U.S. Cl.
CPC ....... *H01M 4/525* (2013.01); *H01M 10/0525* (2013.01); *H01M 50/46* (2021.01); *H01M 2004/028* (2013.01)

(58) Field of Classification Search
CPC ........... H01M 50/46; H01M 2004/028; H01M 4/131; H01M 4/364; H01M 10/052; H01M 4/13; H01M 4/02; H01M 4/62; H01M 10/42; C01P 2002/54; C01P 2002/76; C01P 2002/77; C01G 53/42; Y02E 60/10
See application file for complete search history.

(56) References Cited

U.S. PATENT DOCUMENTS

| | | | | |
|---|---|---|---|---|
| 9,023,525 | B2 * | 5/2015 | Chang | H01M 4/131 429/231.1 |
| 9,077,036 | B2 | 7/2015 | Senoue et al. | |
| 9,236,610 | B2 * | 1/2016 | Chang | H01M 10/0566 |
| 10,522,833 | B2 | 12/2019 | Beck et al. | |
| 2004/0157124 | A1 | 8/2004 | Goh et al. | |
| 2004/0201948 | A1 | 10/2004 | Hosoya et al. | |
| 2005/0118496 | A1 | 6/2005 | Chang et al. | |
| 2006/0257737 | A1 | 11/2006 | Goh et al. | |
| 2010/0203386 | A1 | 8/2010 | Chang et al. | |
| 2013/0011727 | A1 | 1/2013 | Chang et al. | |
| 2014/0315078 | A1 | 10/2014 | Chang et al. | |
| 2016/0344027 | A1 | 11/2016 | Asari | |
| 2017/0207455 | A1 | 7/2017 | Watanabe et al. | |
| 2020/0075957 | A1 | 3/2020 | Jeon et al. | |
| 2020/0083525 | A1 | 3/2020 | Lee | |
| 2020/0161651 | A1 | 5/2020 | Sun et al. | |
| 2020/0176754 | A1 | 6/2020 | Lho et al. | |
| 2020/0212442 | A1 | 7/2020 | Watanabe et al. | |

FOREIGN PATENT DOCUMENTS

| | | | |
|---|---|---|---|
| EP | 1665420 | B1 | 6/2006 |
| JP | H11121002 | A | 4/1999 |
| JP | 2003346806 | A | 12/2003 |
| JP | 2010047466 | A | 3/2010 |
| JP | 6200067 | B2 | 9/2017 |
| JP | 2019506703 | A | 3/2019 |
| KR | 20050030588 | A | 3/2005 |
| KR | 100612089 | B1 | 8/2006 |
| KR | 20060111393 | A | 10/2006 |
| KR | 20180115644 | A | 10/2018 |
| KR | 20190059115 | A | 5/2019 |
| KR | 20190059242 | A | 5/2019 |
| KR | 20190078392 | A | 7/2019 |
| KR | 102046418 | B1 | 12/2019 |

OTHER PUBLICATIONS

Kang, K. et al., "Synthesis, Electrochemical Properties, and Phase Stability of Li2NiO2 with the Immm Structure" Chem. Mater., Jun. 2004, pp. 2685-2690, vol. 16. American Chemical Society.

Lee, H. et al., "Li2NiO2 as a Novel Cathode Additive for Overdischarge Protection of Li-Ion Batteries" Chem. Mater., Dec. 2007, pp. 5-7, vol. 20. American Chemical Society.

Han, C. et al., "Enhanced cycling performance of surface-doped LiMn2O4 modified by a Li2CuO2—Li2NiO2 solid solution for rechargeable lithium-ion batteries" Electrochimica Acta, Dec. 2016, pp. 71-79, vol. 224. Elsevier Ltd.

Davidson, J. et al., "Short Range and Long Range Magnetic Order 1T-Li2NiO2" Journal Of Solid State Chemistry, Dec. 1992, pp. 410-416, vol. 105. Elsevier.

Ruther, R. et al., "Structural Transformations in High-Capacity Li2Cu0.5Ni0.5O2 Cathodes" Chemistry of Materials, Mar. 2017, pp. 2997-3005, vol. 29. ACS Publications.

Ohzuku, T. et al., "Electrochemistry and Structural Chemistry of LiNiO2 (R3m) for 4 Volt Secondary Lithium Cells" J. Electrochem. Soc. Jul. 1993, pp. 1862-1870, vol. 140.

Davidson, I. et al., "Structure of 1T-Li2NiO from powder neutron diffraction" Solid State Ionics, Dec. 1990, pp. 243-247, vol. 46. Elsevier Science Publishers B.V. (North-Holland).

Search Report dated Apr. 12, 2024 from Office Action for Chinese Application No. 202180005322.3 issued Apr. 16, 2024. 2 pgs.

Dahn, J. R. et al., "Structure and electrochemistry of Li1+-yNiO2 and a new Li2NiO2 phase with the Ni (OH)2 structure", Solid State Ionics, Dec. 1, 1990 (Dec. 1, 1990), pp. 87-97, vol. 44, No. 1-2, North Holland PUB, Amsterdam, NL. XP025717794.

Extended European Search Report including Written Opinion for Application No. 21848687.6 dated Dec. 5, 2022, pp. 1-8.

Park H, et al., Li2NiO2 as a sacrificing positive additive for lithium-ion batteries. Electrochimica Acta. Oct. 1, 2013;108:591-5. 5 pgs.

* cited by examiner

【FIG. 1】
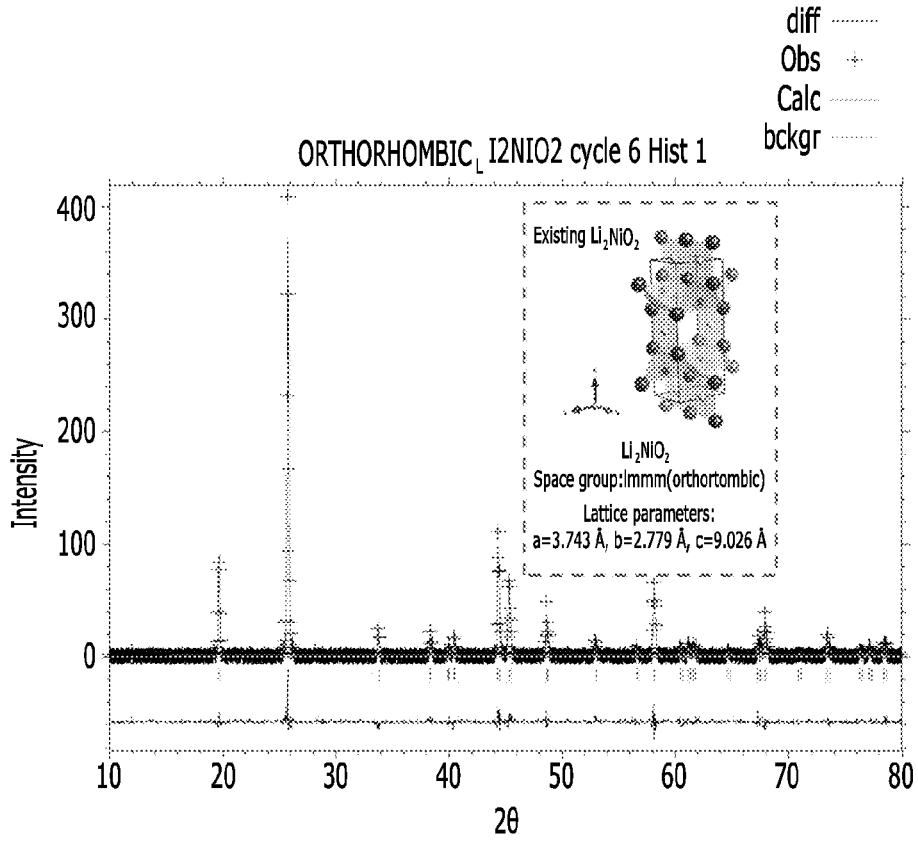

【FIG. 2】
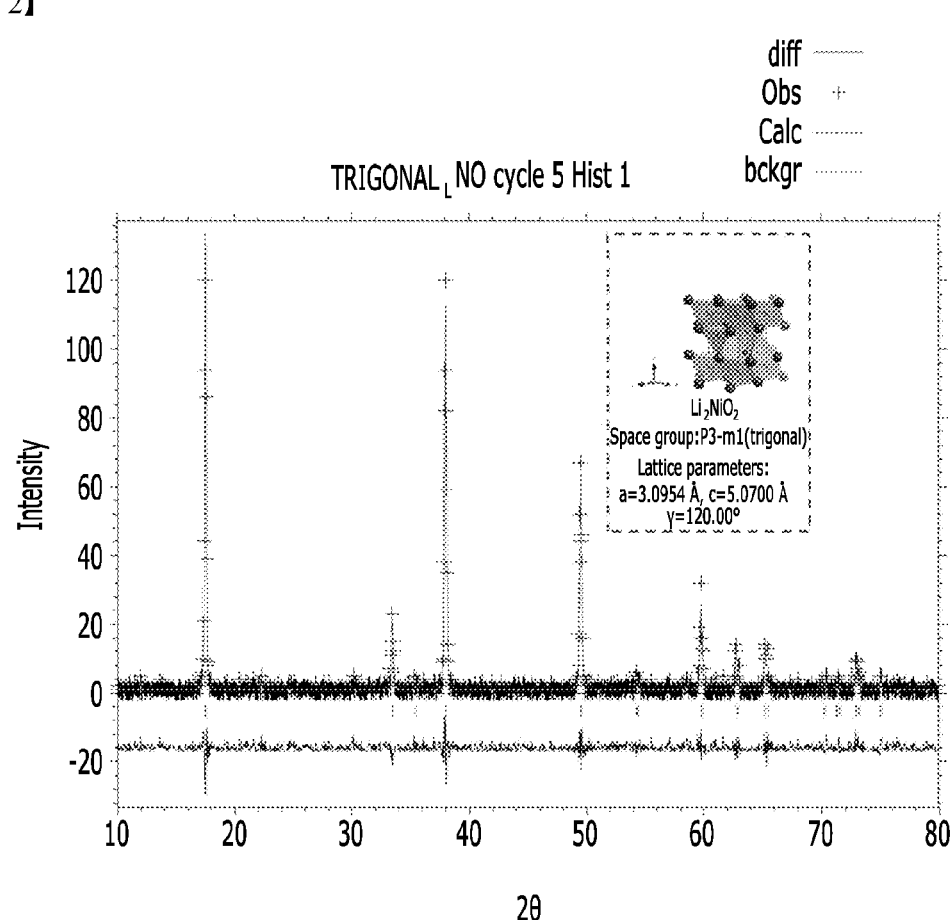

【FIG. 3】
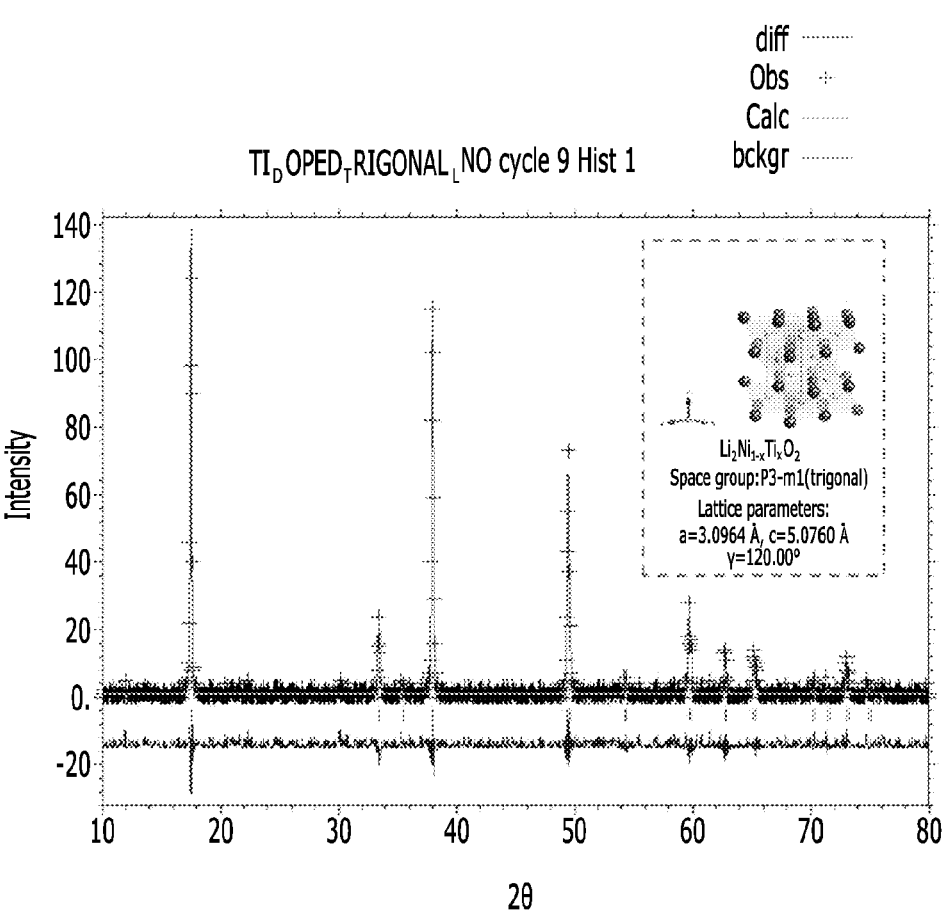

IRREVERSIBLE ADDITIVE CONTAINED IN CATHODE MATERIAL FOR SECONDARY BATTERY, CATHODE MATERIAL INCLUDING THE SAME, AND SECONDARY BATTERY INCLUDING CATHODE MATERIAL

CROSS-REFERENCE TO RELATED APPLICATIONS

The present application is a national phase entry under 35 U.S.C. § 371 of International Application No. PCT/KR2021/009531, filed Jul. 23, 2021, which claims priority from Korean Patent Application No. 10-2020-0093872 filed on Jul. 28, 2020, and Korean Patent Application No. 10-2021-0094000 filed on Jul. 19, 2021, all of which are incorporated herein by reference in their entirety.

TECHNICAL FIELD

The present disclosure relates to an irreversible additive contained in a cathode material for a secondary battery, a cathode material including the same, and a secondary battery including the cathode material.

BACKGROUND ART

Due to the rapid increase in the use of fossil fuels, the demand for the use of alternative energy or clean energy is increasing, and as a part thereof, the fields that are being studied most actively are the fields of power generation and power storage using electrochemistry.

Currently, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high energy density and operating potential, has a long cycle life, and a low self-discharge rate, and has been commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density is being actively conducted, a part of which are in a commercializing stage.

Carbon materials are mainly used as an anode active material of such lithium secondary battery, and lithium transition metal composite oxide is used as an cathode active material of the lithium secondary battery. Among them, in addition to lithium cobalt composite metal oxides such as $LiCoO_2$ having high operating voltage and excellent capacity characteristics, various lithium transition metal oxides such as $LiNiO_2$, $LiMnO_2$, $LiMn_2O_4$ or $LiFePO_4$ have been developed.

Meanwhile, due to the consumption of Li ions at the time of the initial charge/discharge, the formation of SEI (solid electrolyte interphase) layer and the irreversibility of cathode and anode occur. Consequently, the energy density is reduced, and there is a problem that the theoretical amount that can be designed cannot be sufficiently used.

In order to solve these problems, an irreversible additive can be added to the cathode material to supplement lithium ions. However, $Li_2NiO_2$, which is a commonly used irreversible additive, has an orthorhombic crystal structure and belongs to a space group of Immm. However, the above material has a problem of causing the generation of impurities or gas while undergoing three stages of structural changes in the operating voltage range after the initial charge of the secondary battery.

Specifically, the above material maintains an orthorhombic crystal structure in the range of 3.0 to 3.5V, but depending on the de-intercalation of Li, the crystal structure changes three times to a trigonal system at 3.5 to 4.0 V and to a monoclinic system at 3.5 to 4.25 V. In particular, the irreversible additive ($Li_2NiO_2$) having an orthorhombic crystal structure leads to unpredictable by-product and extra gas generation when the crystal structure is changed to a trigonal system. Moreover, since it undergoes a change in the crystal structure, there also is a problem that the structural stability is deteriorated.

DETAILED DESCRIPTION OF THE PRESENT DISCLOSURE

Technical Problem

It is an object of the present disclosure to provide an irreversible additive that minimizes generation of impurities or gas and has excellent structural stability in the operating voltage range of a secondary battery, even while sufficiently exhibiting Li ions at the initial charge.

It is another object of the present disclosure to provide a cathode material for a secondary battery including the irreversible additive, and a secondary battery exhibiting excellent electrochemical properties by including the same.

Technical Solution

According to one embodiment of the present disclosure, there is provided an irreversible additive contained in a cathode material for a secondary battery, the irreversible additive being an oxide represented by the following chemical formula 1, wherein the oxide has a trigonal crystal structure, $$Li_{2+a}Ni_{1-b}Ti_bO_{2+c} \tag{1}$$

in the above formula, $-0.2 \le a \le 0.2$, $0 < b \le 0.2$, $0 \le c \le 0.2$.

The oxide may belong to a space group of P3-m1.

The oxide may have a crystal lattice of $a=3.0964$ Å, $c=5.0760$ Å, and $\gamma=120.00°$.

The oxide may have an oxygen formation energy of 4.25 eV or more and 5.0 eV or less.

According to another embodiment of the present disclosure, there is provided a cathode material comprising the above-mentioned irreversible additive and a cathode active material.

The content of the irreversible additive may be 0.1% by weight to 10% by weight based on the total weight of the cathode material.

According to yet another embodiment of the present disclosure, there is provided a secondary battery comprising a cathode in which a cathode material is coated onto a cathode current collector, wherein the cathode material includes an irreversible additive including an oxide represented by the following chemical formula 1, and a cathode active material, and the irreversible additive has a trigonal system and is converted into a monoclinic system within a range in which the operating voltage range of the secondary battery is 4.0V or more.

$$Li_{2+a}Ni_{1-b}Ti_bO_{2+c} \tag{1}$$

in the above formula, $-0.2 \leq a \leq 0.2$, $0 < b \leq 0.2$, and $0 \leq c \leq 0.2$.

The irreversible additive may belong to a space group of C2/m when having a monoclinic crystal structure.

The cathode active material may include an oxide represented by the following chemical formula 2.

$$Li(Ni_aCo_bMn_c)O_2 \tag{2}$$

in the above formula, $0 < a < 1$, $0 < b < 1$, $0 < c < 1$, and $a+b+c=1$.

The secondary battery has a structure in which an electrode assembly is built in a battery case together with an electrolyte, with the electrode assembly comprising: the cathode; an anode in which an anode material including an anode active material is coated onto an anode current collector; and a separator that is interposed between the cathode and the anode.

Advantageous Effects

As the irreversible additive according to the present disclosure is the oxide represented by the chemical formula 1 and has a trigonal crystal structure, problems of generating impurities and gas due to the de-intercalation of excess Li ions can be significantly reduced.

In addition, since the structural stability can be further improved due to the substitution of Ti, a lithium secondary battery produced using a cathode material including the same can effectively compensate for irreversibility and also exhibit more excellent electrochemical properties and lifespan characteristics.

BRIEF DESCRIPTION OF THE DRAWINGS

FIG. 1 is a graph showing the XRD measurement results of Comparative Example 1 according to Experimental Example 1;

FIG. 2 is a graph showing the XRD measurement results of Comparative Example 2 according to Experimental Example 1; and FIG. 3 is a graph showing the XRD measurement results of Example 1 according to Experimental Example 1.

DETAILED DESCRIPTION OF THE EMBODIMENTS

Hereinafter, embodiments of the present disclosure will be described in detail so that those skilled in the art can easily implement them. However, the present disclosure may be modified in various different ways, and as such the present disclosure is not limited to the embodiments set forth herein An irreversible additive contained in a cathode material for a secondary battery, a cathode material including the same, and a secondary battery including the cathode material according to embodiments of the present disclosure will be described below.

Conventionally, as the irreversible additive, an oxide of LNO($Li_2NiO_2$) was prepared by mixing a lithium raw material and a nickel raw material and then heat-treating the mixture. When general raw materials were mixed and heat-treated in this manner, the oxide was produced into a material having an orthorhombic crystal structure, which is the most stable form. Therefore, conventionally, an oxide having an orthorhombic crystal structure has been added as the irreversible additive.

In contrast, according to the embodiments of the present disclosure, when the oxide used as the irreversible additive is added as a material having a trigonal crystal structure from the beginning, the trigonal and monoclinic crystal structures can be reversibly maintained according to the voltage of the secondary battery within the operating voltage range of the secondary battery.

According to one embodiment of the present disclosure, the irreversible additive contained in a cathode material for a secondary battery is an oxide represented by the following chemical formula 1, wherein the oxide has a trigonal crystal structure, $$Li_{2+a}Ni_{1-b}Ti_bO_{2+c} \tag{1}$$

in the above formula, $-0.2 \leq a \leq 0.2$, $0 < b \leq 0.2$, and $0 \leq c \leq 0.2$.

Unlike a conventional irreversible additive, according to the present embodiment, the oxide represented by the chemical formula 1 may be added as an irreversible additive. The irreversible additive has a trigonal crystal structure while being an excessive lithiated oxide in which a molar ratio of Li is about twice that of the transition metal, as represented by the chemical formula 1.

The irreversible additive represented by the chemical formula 1 according to the present embodiment has a trigonal crystal structure while having an excessive amount of lithium, unlike the case where the conventional oxide becomes $LiNiO_2$ by de-intercalation of Li ions and has a trigonal crystal structure. Therefore, if the irreversible additive according to the present embodiment has only a lithium-excess trigonal crystal structure, it does not have an orthorhombic crystal structure, which is a stable crystal structure, and thus, subsequently, the crystal structure changes according to the voltage, so that the structural stability may be deteriorated.

In this regard, according to the present embodiment, as shown in the chemical formula 1, a part of Ni is substituted by Ti in the irreversible additive unlike the conventional oxide, thereby capable of enhancing the structural stability, further reducing by-products and increasing the stability.

At this time, the Ti may be substituted by a part of Ni in an amount of more than 0 to 20% or less on a molar basis. More preferably, the Ti may be substituted by a part of Ni in an amount of more than 0 to 10% or less on a molar basis. In one example, the oxide may be $Li_2Ni_{0.97}Ti_{0.03}O_2$.

The irreversible additive represented by the chemical formula 1 as described above may, specifically, belong to a space group of P3-m1, and more specifically, the crystal lattice of the oxide may be a=3.0964 Å, c=5.0760 Å, and γ=120.00°.

The oxide represented by the chemical formula 1 according to the present embodiment may be an oxygen formation energy of 4.25 eV or more and 5.0 eV or less. More specifically, the oxygen formation energy of the oxide may be 4.4 eV or more and 4.9 eV or less. In one example, the oxygen formation energy of the oxide may be 4.5 eV or more and 4.8 eV or less.

Accordingly, the oxide represented by the chemical formula 1 according to the present embodiment can have a relatively high oxygen formation energy compared to the conventional oxide not substituted with Ti, thereby having a high structural stability of the crystal structure and reducing by-products caused by side reactions.

On the other hand, when the oxygen formation energy of the oxide is less than 4.25 eV, the oxide can have a relatively low oxygen formation energy and thus, the structural stability of the crystal structure is relatively low, so that structural changes can easily occur, and by-products caused by side reactions may also be increased. In addition, when the oxygen formation energy of the oxide is more than 5.0 eV, there is a problem that the production of oxides is not easy.

The material as described above prepared by a process in which Ti-substituted $LiNi_{1-b}Ti_bO_2$ (where $0<b\leq0.2$) is mixed with $Li^+$benzophenone⁻ and reacted under THF to obtain a trigonal $Li_2Ni_{1-b}Ti_bO_2$ (where $0<b\leq0.2$) having weak crystallinity, which is then heat-treated under an inert atmosphere to obtain a trigonal $Li_2Ni_{1-b}Ti_bO_2$ (where $0<b\leq0.2$) having high crystallinity.

The reaction under THF is specifically performed by a process in which the mixture is stirred, filtered, washed with dry THF, and then dried under vacuum.

The heat treatment is performed at 200 to 400° C. for 10 to 24 hours under an inert atmosphere. More preferably, the heat treatment may be performed at 200 to 300° C. for 12 to 16 hours under an inert atmosphere. In one example, the heat treatment is performed at 225° C. for 14 hours under an inert atmosphere.

The inert atmosphere may be a helium or argon atmosphere, and the heat treatment is performed while flowing the gases.

Further, the preparation must be performed within the range of temperature and time during the heat treatment, and thereby only the crystallinity can be improved without giving changes in the crystal structure of the trigonal $Li_2Ni_{1-b}Ti_bO_2$ (where $0<b\leq0.2$) formed by reacting under THF. When the temperature is too low or the time is short, the crystallinity is not sufficiently improved, and when the temperature is too high or the time is long, it can give changes in the crystal structure itself, which is thus not preferable.

The $Li_2Ni_{1-b}Ti_bO_2$ (where $0<b\leq0.2$) can be prepared by a method of substituting Ti in a conventionally known method for producing $LiNiO_2$.

For example, it is prepared by mixing a lithium raw material and a nickel raw material together with a titanium raw material in a molar ratio satisfying the composition ratio and then heat-treating the mixture.

The heat treatment is performed at 650 to 800° C. for 10 to 24 hours under an air atmosphere. In the case of wet method, a drying process may be further included. More preferably, the heat treatment may be performed under a nitrogen ($N_2$) atmosphere. More preferably, the heat treatment may be performed at 650 to 750° C. for 16 to 20 hours. In one example, the heat treatment may be performed at 680° C. for 18 hours. The preparation must be performed within the range of the temperature and time of the heat treatment, so that the reaction between the lithium raw material and the nickel raw material and further the titanium raw material can sufficiently occur, and unreacted materials can be minimized.

As the lithium raw material, lithium-containing oxides, sulfates, nitrates, acetates, carbonates, oxalates, citrates, halides, hydroxides or oxyhydroxides, and the like can be used, and specific examples thereof include $Li_2CO_3$, $LiNO_3$, $LiNO_2$, $LiOH$, $LiOH·H_2O$, $LiH$, $LiF$, $LiCl$, $LiBr$, $LiI$, $CH_3COOLi$, $Li_2O$, $Li_2SO_4$, $CH_3COOLi$, $Li_3C_6H_5O_7$ or the like. Any one alone or a mixture of two or more of them may be used.

As the nickel raw material, nickel-containing oxides, sulfates, nitrates, acetates, carbonates, oxalates, citrates, halides, hydroxides or oxyhydroxides, and the like can be used, and specific examples thereof include $NiO$, $Ni(NO_3)_2$, $LiNO_2$, $NiSO_4$, $Ni(OH)_2$, and the like. Any one alone or a mixture of two or more of them may be used.

The titanium raw material may be a titanium-containing oxide. In one example, the titanium raw material may be $TiO_2$.

The irreversible additive of the crystal structure as described above can provide sufficient Li at the initial charge due to an excessive amount of lithium to solve the irreversibility problem and also omit one stage of change in crystal structure within the operating voltage range, thereby being able to not only minimize incidental problems such as generation of impurities or gas resulting from de-intercalation of an excessive amount of Li ions, but also improve the structural stability to minimize side reactions.

Meanwhile, according to another embodiment of the present disclosure, there is provided a cathode material including the irreversible additive and a cathode active material. At this time, the content of the irreversible additive may be 0.1% to 10% by weight, specifically 1% to 5% by weight, and more specifically 1% to 3% by weight based on the total weight of the cathode material.

When the content of the irreversible additive is less than 0.1% by weight outside the above range, the anode efficiency compensation effect due to the addition of an irreversible additive cannot be obtained, and when the content exceeds 10% by weight, problems such as volume expansion of the electrode caused by the generation of impurities or gas, and deterioration of life may occur.

Further, according to one embodiment of the present disclosure, there is provided a secondary battery including a cathode in which a cathode material is coated onto a cathode current collector, wherein the cathode material includes an irreversible additive including an oxide represented by the following chemical formula 1, and a cathode active material, and the irreversible additive has a trigonal system and is converted into a monoclinic system within a range in which the operating voltage range of the secondary battery is 4.0V or more.

$$Li_{2+a}Ni_{1-b}Ti_bO_{2+c} \qquad (1)$$

in the above formula, $-0.2\leq a\leq0.2$, $0<b\leq0.2$, and $0\leq c\leq0.2$.

As described above, the crystal structure of the irreversible additive of lithium nickel titanium oxide changes in the operating voltage range of the secondary battery, which is similar even at the time of using the irreversible additive according to the present disclosure.

Therefore, according to the present disclosure, even if the oxide represented by the chemical formula 1 having a trigonal crystal structure is added as an irreversible additive, the crystal structure of the oxide can change to a monoclinic crystal system within the operating voltage range of the secondary battery in accordance with the intercalation and de-intercalation of Li ions.

In other words, the irreversible additive according to the present disclosure is added in the form of a trigonal crystal structure to the cathode material, and can be reversibly converted into a monoclinic crystal system within the operating voltage range of the secondary battery. At this time, the oxide having a monoclinic crystal structure may, specifically, belong to a space group of C2/m.

On the other hand, the cathode active material contained in the cathode material may be, for example, $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-d}Co_dO_2$, $LiCo_{1-d}$, $Mn_dO_2$, $LiNi_{1-d}Mn_dO_2$ ($0 \le d<1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ ($0<e<2$), $LiCoPO_4$, $LiFePO_4$, or the like, and any one alone or a mixture of two or more of them may be used.

Of these, specifically, the cathode active material may include an oxide represented by the following chemical formula 2.

$$Li(Ni_aCo_bMn_c)O_2 \qquad (2)$$

in the above formula, $0<a<1$, $0<b<1$, $0<c<1$, and $a+b+c=1$.

The oxide of the chemical formula 2 is easily changed in the crystal structure from hexagonal to monoclinic while Li ions being de-intercalated and intercalated in the operating voltage range of the secondary battery. Therefore, since the oxide can have a structure similar to that of the irreversible additive of the present disclosure within the operating range, it is more effective in the use of the irreversible additive according to the present disclosure.

More specifically, the oxide represented by the chemical formula 2 may be contained in an amount of 80% by weight or more based on the total weight of the cathode active material.

The cathode material may further include a conductive material, a binder, a filler and the like, in addition to the cathode active material and the irreversible additive.

The conductive material is used to impart conductivity to the electrode, and the conductive material can be used without particular limitation as long as it has electronic conductivity without causing chemical changes to the battery to be configured.

The binder plays a role of improving adhesion between the cathode active material particles and adhesive strength between the cathode active material and the current collector. Specific examples thereof include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and any one alone or a mixture of two or more of them may be used.

The cathode current collector is not particularly limited as long as it has conductivity while not causing chemical changes to the battery, and for example, stainless steel, aluminum, nickel, titanium, calcined carbon, or aluminum or stainless steel having a surface treated with carbon, nickel, titanium, silver, etc. may be used.

The secondary battery may have a structure in which an electrode assembly is built in a battery case together with an electrolyte, with the electrode assembly including: the cathode; an anode in which an anode material including an anode active material is coated onto an anode current collector; and a separator that is interposed between the cathode and the anode. Specifically, the secondary battery may be a lithium secondary battery.

The anode may also be produced in a form in which an anode material including an anode active material is coated onto an anode current collector, and the anode material may further include a conductive material and a binder as described above, together with an anode active material.

The anode current collector is not particularly limited as long as it has high conductivity without causing chemical changes to the battery. For example, copper, stainless steel, aluminum, nickel, titanium, calcined carbon, copper or stainless steel having a surface treated with carbon, nickel, titanium, silver, etc., aluminum-cadmium alloy, and the like may be used.

The separator separates the anode and the cathode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable.

The lithium secondary battery according to the present disclosure as described above may be used as a power source of devices in portable devices such as mobile phones, notebook computers, digital cameras, and electric vehicles such as hybrid electric vehicles (HEVs).

Hereinafter, the details of experiments in Examples of the present disclosure described above and Comparative Examples to be compared therewith will be described.

Comparative Example 1

22.9 g of $Li_2O$ and 30 g of NiO (molar ratio 1:1) were mixed, and then heat-treated at 685 degrees Celsius for 18 hours under an $N_2$ atmosphere, and then the resulting reaction product was cooled to obtain irreversible additive particles $Li_2NiO_2$.

Comparative Example 2

$LiNiO_2$ and more than 1.5M $Li^+$Thenzophenone$^-$ were reacted in the presence of THF (tetrahydrofuran) under an inert atmosphere.

Specifically, the mixture of the above materials was stirred for one day, and the mixed powders were filtered. The obtained mixed powder was washed with dry THF and dried under vacuum to obtain a pre-powder in which a small amount of trigonal $Li_2NiO_2$ and $LiNiO_2$ were mixed.

Subsequently, the pre-powder was heat-treated at 225° C. for 14 hours under dry helium flow to obtain a $Li_2NiO_2$ powder having a trigonal crystal structure with improved crystallinity.

Example 1

22.9 g of $Li_2O$, 30 g of NiO and 2.39 g of $TiO_2$ (molar ratio 1:1:0.03) were mixed, and then heat-treated at 685 degrees Celsius for 18 hours under an $N_2$ atmosphere, and then the resulting reaction product was cooled to obtain irreversible additive particles $LiN_{0.97}Ti_{0.03}O_2$.

$LiNi_{0.97}Ti_{0.03}O_2$ and more than 1.5M $Li^+$Thenzophenone$^-$ were reacted in the presence of THF (tetrahydrofuran) under an inert atmosphere.

Specifically, the mixture of the above materials was stirred for one day, and the mixed powders were filtered. The obtained mixed powder was washed with dry THF and dried under vacuum to obtain a pre-powder in which a small amount of trigonal $Li_2Ni_{0.97}Ti_{0.30}O_2$ and $LiNi_{0.97}Ti_{0.03}O_2$ were mixed.

Subsequently, the pre-powder was heat-treated at 225° C. for 14 hours under dry helium flow to obtain a $Li_2Ni_{0.97}Ti_{0.03}O_2$ powder having a trigonal crystal structure with improved crystallinity.

Experimental Example 1—XRD Analysis 2 g of the irreversible additive particles prepared in Comparative Examples 1 and 2 and Example 1 were collected as samples, respectively, and subjected to XRD analysis. The results are shown in FIGS. 1 to 3, respectively.

XRD analysis was measured with a Bruker XRD D4 instrument, and experiment was performed from 10 to 80 degrees in 0.02 steps using a Cu source target.

Referring to FIGS. 1 to 3, it can be seen that the irreversible additives having mutually different structures according to Comparative Examples 1, 2 and Example 1 are formed. Specifically, it can be seen that Comparative Example 1 is formed in an orthorhombic type crystal structure, and Comparative Example 2 and Example 1 are formed in a trigonal crystal structure.

Production of Cathode and Lithium Secondary Battery

Using the irreversible additives prepared in Comparative Example 2 and Example 1, a cathode and a lithium secondary battery were produced by the following method.

Specifically, the irreversible additive prepared in Comparative Example 2 and Example 1, $LiNi_{0.4}Mn_{0.3}Co_{0.3}O_2$ as a cathode active material, a carbon black conductive material and a PVdF binder were mixed in a weight ratio of 4.6:87.9:3.5:4 in an N-methylpyrrolidone solvent to prepare a cathode slurry. The slurry was coated onto an aluminum current collector, and dried and rolled to produce a cathode.

In addition, MCMB (mesocarbon microbead), which is an artificial graphite mixed with 10 wt. % of SiO as an anode active material, a carbon black conductive material and PVdF binder were mixed in a weight ratio of 90:5:5 in an N-methylpyrrolidone solvent to prepare a composition for forming an anode, which was coated onto a copper current collector to produce an anode.

A porous polyethylene separator was interposed between the cathode and the anode produced as described above to produce an electrode assembly. The electrode assembly was placed inside a case, and then an electrolyte was injected into the case to produce a lithium secondary battery. At this time, the electrolyte was prepared by dissolving 1.15M lithium hexafluorophosphate ($LiPF_6$) in an organic solvent consisting of ethylene carbonate/dimethyl carbonate/ethyl-methyl carbonate (EC/DMC/EMC mixing volume ratio=3/4/3).

Experimental Example 2

2 g of the irreversible additive particles prepared in Comparative Example 1, Comparative Example 2 and Example 1 were collected as samples, respectively, and their oxygen formation energies were measured. The results are shown in Table 1 below.

Specifically, the calculation of oxygen formation energy was performed based on the calculated value for DFT (density functional theory), PBE functional PAW_PBE pseudopotential, cut-off energy=520 eV, calculation model: supercell with $Li_{48}Ni_{24}O_{48}$ atoms-substituting one Ni with Ti (ratio~4.17 at %), oxygen vacancy (VO) production concentration=1/48 (~2.1 at. %) $O_2$ gas (O-rich environment).

TABLE 1

| | Oxygen ($V_0$) formation energy (eV) |
|---|---|
| Comparative Example 1 | 3.77 |
| Comparative Example 2 | 4.21 |
| Example 1 | 4.69 |

Referring to Table 1, it is confirmed that the energy of the trigonal irreversible additives of Comparative Examples 2 and Example 1 is higher than that of the orthorhombic irreversible additive of Comparative Example 1. It is expected that, during charging and discharging, the orthorhombic irreversible additive undergoes structural changes in the intercalation of Li ions via the trigonal system and then to the monoclinic system, whereas the trigonal irreversible additive is reduced in a structural change stage from the viewpoint that it progresses to the monoclinic system, and the trigonal system does not cause a side reaction as compared with the tetragonal system.

In addition, considering that the energy of the trigonal irreversible additive of Example 1 is higher than that of the trigonal additive of Comparative Example 2, it is presumed that the structural change in the intercalation of Li ions during charging and discharging will form more robust structure than the trigonal system without substitution. Therefore, it is expected that no side reactions will occur compared to the trigonal irreversible additives not substituted with Ti.

Although the present disclosure has been shown and described above with reference to the preferred embodiments, the scope of the present disclosure is not limited thereto, and numerous other modifications and embodiments can be devised by those skilled in the art, without departing from the spirit and scope of the principles of the present disclosure described in the appended claims. Further, these modified embodiments should not be understood individually from the technical spirit or perspective of the present disclosure.

The invention claimed is:

1. An irreversible additive contained in a cathode material for a secondary battery, comprising,
   an oxide represented by the following chemical formula 1,
   wherein the oxide has a trigonal crystal structure and belongs to a space group of P3-m1, $$Li_{2+a}Ni_{1-b}Ti_bO_{2+c} \tag{1}$$

in the above formula, $-0.2 \leq a \leq 0.2$, $0 < b \leq 0.2$, and $0 \leq c \leq 0.2$.

2. The irreversible additive according to claim 1, wherein: the oxide has a crystal lattice of a=3.0964 Å, c=5.0760 Å, and γ=120.00°.

3. The irreversible additive according to claim 1, wherein: the oxide is $Li_2Ni_{0.97}Ti_{0.03}O_2$.

4. The irreversible additive according to claim 1, wherein: the oxide has an oxygen formation energy of 4.25 eV or more and 5.0 eV or less.

5. A cathode material comprising the irreversible additive of claim 1 and a cathode active material.

6. The cathode material according to claim 5, wherein: a content of the irreversible additive is 0.1% by weight to 10% by weight based on the total weight of the cathode material.

7. A secondary battery comprising a cathode in which the cathode material of claim 5 is coated onto a cathode current collector,
   wherein
   the irreversible additive is converted into a monoclinic system within an operating voltage range of 4.0V or more.

8. The secondary battery according to claim 7, wherein: the irreversible additive belongs to a space group of C2/m when having a monoclinic crystal structure.

9. The secondary battery according to claim 7, wherein:
the cathode active material comprises an oxide represented by the following chemical formula 2, $$Li(Ni_aCo_bMn_c)O_2 \tag{2}$$

in the above formula, $0<a<1$, $0<b<1$, $0<c<1$, and $a+b+c=1$.

10. The secondary battery according to claim 7, wherein:
the secondary battery has a structure in which an electrode assembly is built in a battery case together with an electrolyte, with the electrode assembly comprising:
the cathode;
an anode in which an anode material including an anode active material is coated onto an anode current collector; and
a separator that is interposed between the cathode and the anode.

\* \* \* \* \*